Figure 1:
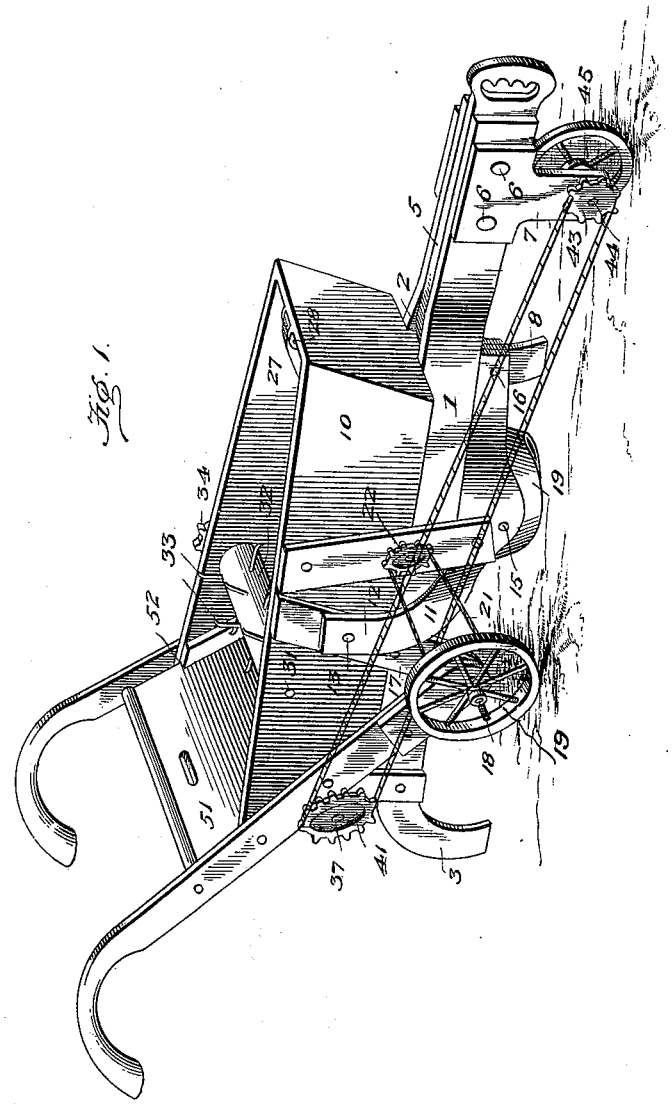

No. 619,740. Patented Feb. 21, 1899.
J. H. FORISTER.
COMBINED CORN AND COTTON SEED PLANTER AND CULTIVATOR.
(Application filed Sept. 16, 1897.)
(No Model.) 3 Sheets—Sheet 1.

Witnesses

Inventor
John H. Forister
by H. B. Willson & Co.
Attorneys

No. 619,740. Patented Feb. 21, 1899.
J. H. FORISTER.
COMBINED CORN AND COTTON SEED PLANTER AND CULTIVATOR.
(Application filed Sept. 16, 1897.)
(No Model.) 3 Sheets—Sheet 2.

Witnesses
Inventor
John H. Forister
by H. B. Willson & Co.
Attorneys

No. 619,740. Patented Feb. 21, 1899.
J. H. FORISTER.
COMBINED CORN AND COTTON SEED PLANTER AND CULTIVATOR.
(Application filed Sept. 16, 1897.)
(No Model.) 3 Sheets—Sheet 3.
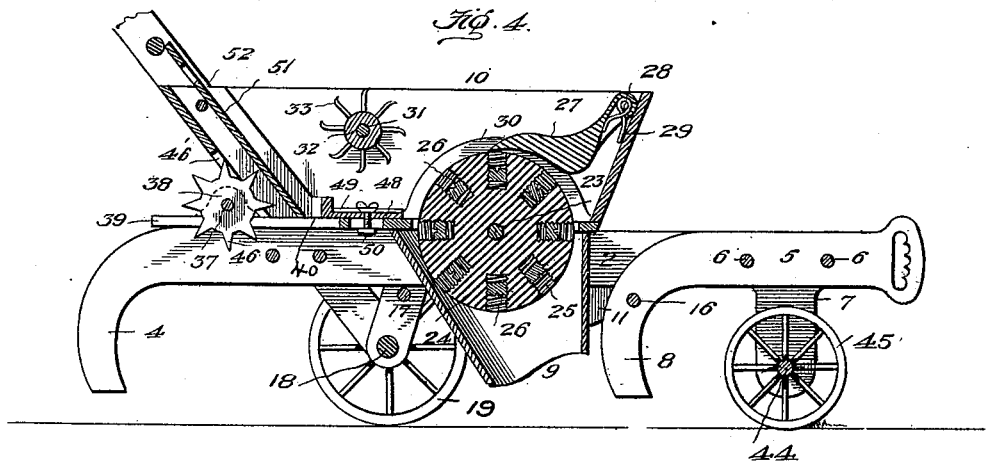
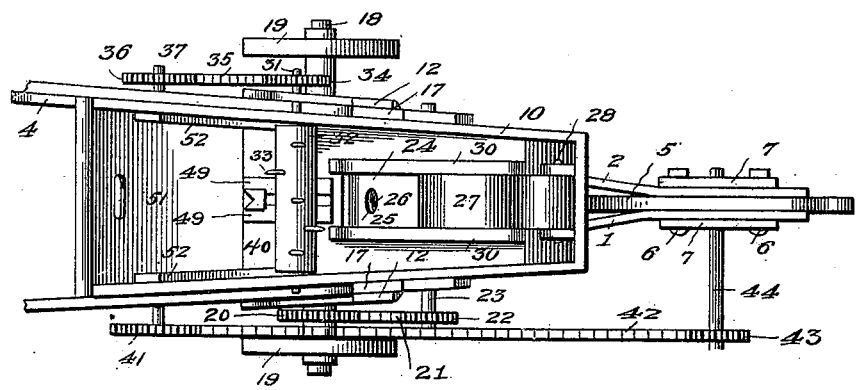
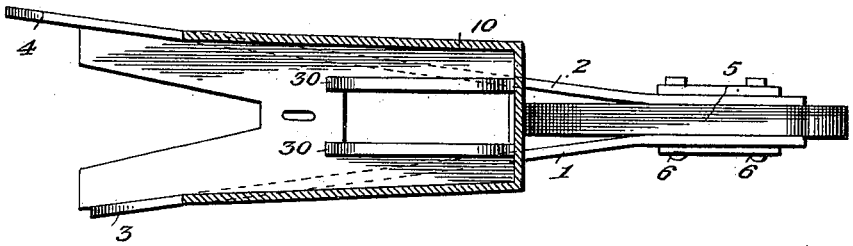
Witnesses
Inventor
John H. Forister
by
Attorneys

UNITED STATES PATENT OFFICE.

JOHN HARDEN FORISTER, OF TOW, TEXAS.

COMBINED CORN AND COTTON-SEED PLANTER AND CULTIVATOR.

SPECIFICATION forming part of Letters Patent No. 619,740, dated February 21, 1899.

Application filed September 16, 1897. Serial No. 651,863. (No model.)

*To all whom it may concern:*

Be it known that I, JOHN HARDEN FORISTER, a citizen of the United States, residing at Tow, in the county of Llano and State of Texas, have invented certain new and useful Improvements in a Combined Corn and Cotton-Seed Planter and Cultivator; and I do declare the following to be a full, clear, and exact description of the invention, such as will enable others skilled in the art to which it appertains to make and use the same.

My invention relates to a combined corn and cotton-seed planter and cultivator; and the object is to simplify the construction and increase the efficiency of this class of machines without materially adding to the cost.

To these ends the invention consists in the construction, combination, and arrangement of the device, as will be hereinafter more fully described, and particularly pointed out in the claim.

In the accompanying drawings the same reference characters indicate the same parts of the invention.

Figure 2:
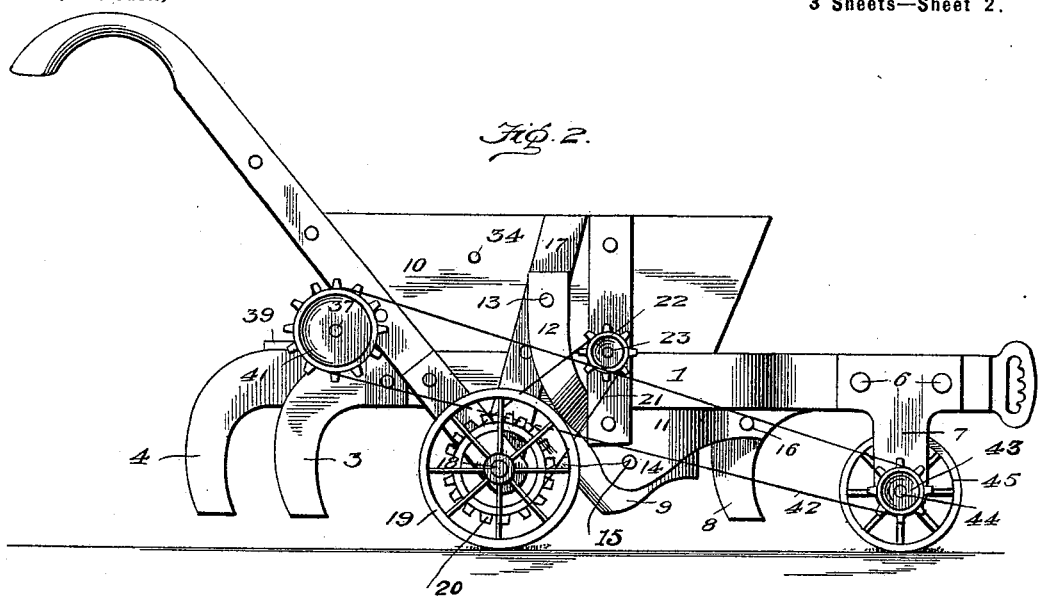
Figure 3:
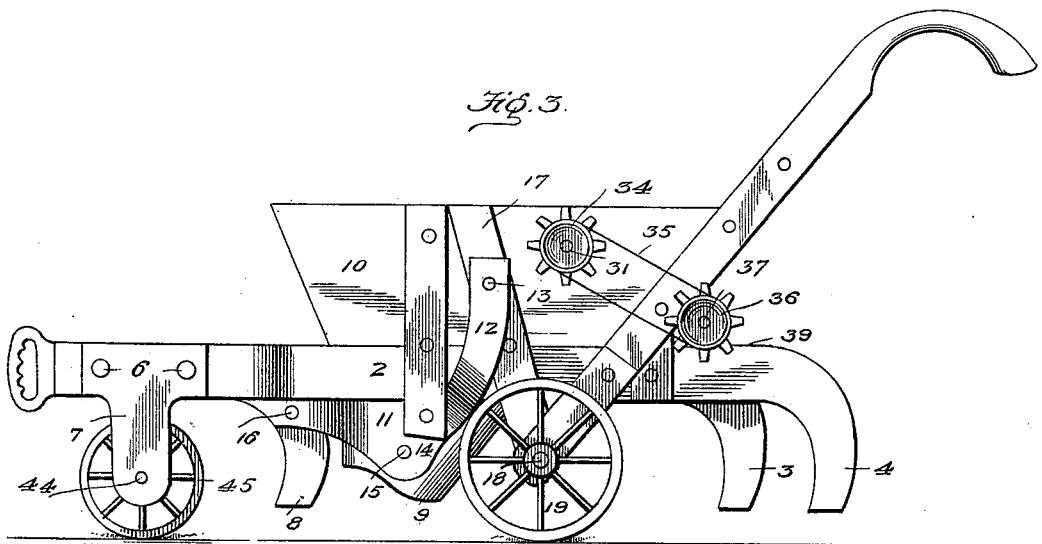

Figure 1 is a perspective view of my improved corn and cotton-seed planter and cultivator combined. Fig. 2 is a right-hand side elevation of the same. Fig. 3 is a left-hand side elevation. Fig. 4 is a longitudinal central section. Fig. 5 is a top plan view. Fig. 6 is a horizontal section on the line of the beam.

1 and 2 represent the diverging beams, their rear ends terminating in the standards 3 and 4, to which are removably secured any suitable form of cultivator-blades. (Not shown.)

5 represents the central beam, removably secured between the forward parallel ends of the beams 1 and 2 by the bolts 6 6, which also pass through and secure the vertically-depending parallel brackets 7 7 in place on the sides of the beams. The rear end of the central beam 5 terminates in the curved standard 8, to which may be removably secured any suitable plow or cultivator point.

9 represents the discharge-spout, supported beneath the seed-hopper 10 by means of the right-angular brackets 11. The vertical arms 12 12 extend upwardly and are secured on each side of said hopper by the bolts 13 and their horizontal arms 14 14, encompassing said spout, to which they are secured by the bolts 15 15, and the forwardly-converging ends of said arms 14 14 are secured to the front standard 8 by the bolt 16.

17 17 represent depending braces secured to the opposite sides of the hopper under the brackets 11 11, and in their lower ends is journaled the transverse axle 18, the outer ends of which are provided with the fixed carrying-wheels 19 19, by means of which said axle and a sprocket-wheel 20, fixed thereon, are rotated. From the sprocket-wheel 20 a sprocket-chain 21 extends to a sprocket-wheel 22, fixed on one end of the transverse shaft 23, journaled in the hopper, and on said shaft is mounted the seed-corn wheel 24, which is provided with a series of radial pockets 25, internally threaded to receive the threaded plugs 26, by means of which the size of the pockets may be increased or diminished to regulate the number of grains of corn to be taken up and discharged by each pocket into the spout.

27 represents the seed cut-off, adjustably secured to the forward end of the hopper by the bolt 28, and 29 represents a spiral spring encompassing the bolt between the seed-guard and the contiguous face of the hopper, which permits the guard to spring away from the seed-wheel should one or more seed become jammed or "cocked" in one of the pockets.

30 30 represent guard-flanges extending on each side of the seed-wheel to prevent the loose seed getting in between the ends of the seed-wheel. A transverse shaft 31 is journaled in the rear part of the hopper, and it carries a cylinder 32, from which a series of radial arms 33 project and which act as agitators when the machine is employed in planting cotton-seed. The outer end of this shaft 31 is provided with a sprocket-wheel 34, from which a sprocket-chain 35 extends to a sprocket-wheel 36 on the cotton-seed feed-shaft 37, journaled in the bearing-boxes 38 38 on the longitudinal extensions 39 39 of the bottom 40 of the hopper. The opposite end of this feed-shaft 37 is also provided with a sprocket-wheel 41, from which a sprocket-chain 42 extends to a smaller sprocket-wheel 43, fixed on the shaft 44, journaled in the brackets 7 7, and said shaft is provided with a ground-wheel 45, which imparts motion to the parts just described.

46 represents a spur feed-wheel fixed on the shaft 37, and it projects through a slot 46' in the rear part of the hopper to feed the cotton-seed to the discharge-opening in the bottom 40.

48 represents the cotton-seed feed-slide, longitudinally adjustable between the plates 49 49, fixed on the bottom of the hopper, the adjustment of said seed-slide being regulated by the set-screw 50.

A sliding plate 51 is detachably secured in the grooves 52 52 in the rear end of the hopper to cover up the cotton-seed feed-wheel when the machine is in use for planting corn. When used as a simple plow or cultivator, the attachments required for planting seed corn or cotton may be detached, and although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

In combination, the diverging beams 1 and 2 and the intermediate draft-beam 5 rigidly secured together at their forward ends and having their rear ends terminating in integral standards, the parallel depending brackets 7 7 secured to the forward ends of said beams, the shaft 44 journaled in said brackets, the sprocket-wheel 43 and the ground-wheel 45 fixed on said shaft, the hopper 10 detachably secured to said beams 1 and 2 and the sprocket-wheel 41 fixed on the outer end of shaft 37 and the sprocket-chain 42 connecting said sprocket-wheels 41 and 43, the depending braces 17 17 secured to the opposite sides of said hopper, the axle 18 journaled in the lower ends of said braces, the carrying-wheels 19 19 fixed on the outer ends of said axle and the sprocket-wheel 20 fixed thereon between one of said braces and the near carrying-wheel, the feed-shaft 23 journaled in the hopper and provided with the sprocket-wheel 22 and the sprocket-chain 21 connecting said sprocket-wheels 20 and 22, the seed-corn feed-wheel 24 fixed on the shaft 23, the lateral parallel guard-flanges 30 30 interposed between the ends of the seed feed-wheel 24 and the side walls of the hopper, the whole constructed and arranged substantially as shown and described.

In testimony whereof I hereunto affix my signature in presence of two witnesses.

JOHN HARDEN FORISTER.

Witnesses:
E. J. DALRYMPLE,
GEO. T. GRAY.